(12) United States Patent  (10) Patent No.: US 8,595,016 B2
Van Sciver et al.  (45) Date of Patent: Nov. 26, 2013

(54) ACCESSING CONTENT USING A SOURCE-SPECIFIC CONTENT-ADAPTABLE DIALOGUE

(75) Inventors: James D. Van Sciver, Wayland, MA (US); Christopher Bader, Medford, MA (US); Michael Anthony Aliotti, Eugene, OR (US); David Carl Bong, Eugene, OR (US)

(73) Assignee: Angle, LLC, Eugene, OR (US)

( * ) Notice: Subject to any disclaimer, the term of this patent is extended or adjusted under 35 U.S.C. 154(b) by 228 days.

(21) Appl. No.: 13/336,639

(22) Filed: Dec. 23, 2011

(65) Prior Publication Data

US 2013/0166292 A1  Jun. 27, 2013

(51) Int. Cl.
  *G10L 15/00* (2013.01)
(52) U.S. Cl.
  USPC ............................... 704/275; 704/9; 707/708
(58) Field of Classification Search
  USPC ....................................... 704/9, 275; 707/708
  See application file for complete search history.

(56) References Cited

U.S. PATENT DOCUMENTS

| | | | |
|---|---|---|---|
| 5,884,262 | A | 3/1999 | Wise et al. |
| 5,884,266 | A | 3/1999 | Dvorak |
| 5,924,068 | A | 7/1999 | Richard et al. |
| 6,269,336 | B1 | 7/2001 | Ladd et al. |
| 6,490,564 | B1 | 12/2002 | Dodrill et al. |
| 6,665,642 | B2 | 12/2003 | Kanevsky et al. |
| 6,675,162 | B1 | 1/2004 | Russell-Falla et al. |
| 6,940,953 | B1 | 9/2005 | Eberle et al. |
| 6,964,014 | B1 | 11/2005 | Parish |
| 7,000,189 | B2 | 2/2006 | Dutta et al. |
| 7,010,581 | B2 | 3/2006 | Brown et al. |
| 7,027,568 | B1 | 4/2006 | Simpson et al. |
| 7,034,691 | B1 * | 4/2006 | Rapaport et al. ............ 340/573.1 |
| 7,137,126 | B1 * | 11/2006 | Coffman et al. ............... 719/328 |
| 7,194,411 | B2 | 3/2007 | Slotznick et al. |
| 7,219,136 | B1 | 5/2007 | Danner et al. |
| 7,263,691 | B2 | 8/2007 | Vehkomaki |
| 7,454,346 | B1 | 11/2008 | Dodrill et al. |
| 7,454,526 | B2 | 11/2008 | Brown et al. |

(Continued)

FOREIGN PATENT DOCUMENTS

| | | |
|---|---|---|
| EP | 1054391 A2 | 11/2000 |
| EP | 1355475 A1 | 10/2003 |
| WO | 03/085624 A1 | 10/2003 |
| WO | 2005/033971 A1 | 4/2005 |

OTHER PUBLICATIONS

"AudioEye", Audio Internet, Retrieved on May 28, 2012, 1 page. Available at : http://www.audioeye.com/.

(Continued)

*Primary Examiner* — Daniel D Abebe
(74) *Attorney, Agent, or Firm* — Robert Plotkin, P.C.

(57) ABSTRACT

A system for accessing content maintains a set of content selections associated with a first user. The system receives first original content from a first content source associated with a first one of the content selections associated with the first user. The system applies, to the first original content, a first rule (such as a parsing rule) that is specific to the first one of the content selections, to produce first derived content. The system changes the state of at least one component of a human-machine dialogue system (such as a text-to-act engine, a dialogue manager, or an act-to-text engine) based on the first derived content. The system may apply a second rule (such as a dialogue rule) to the first derived content to produce rule output and change the state of the human-machine dialogue system based on the rule output.

50 Claims, 10 Drawing Sheets

(56) References Cited

U.S. PATENT DOCUMENTS

| | | | |
|---|---|---|---|
| 7,483,891 | B2 | 1/2009 | Liu et al. |
| 7,505,056 | B2 | 3/2009 | Kurzweil et al. |
| 7,788,100 | B2 | 8/2010 | Slotznick et al. |
| 7,860,872 | B2 | 12/2010 | Serjeantson et al. |
| 7,966,184 | B2 | 6/2011 | O'Conor et al. |
| 2002/0006126 | A1 | 1/2002 | Johnson et al. |
| 2002/0010715 | A1 | 1/2002 | Chinn et al. |
| 2002/0054090 | A1 | 5/2002 | Silva et al. |
| 2003/0033434 | A1 | 2/2003 | Kavacheri et al. |
| 2003/0069734 | A1 | 4/2003 | Everhart |
| 2003/0187648 | A1* | 10/2003 | Dharanipragada et al. ... 704/260 |
| 2004/0059577 | A1 | 3/2004 | Pickering |
| 2005/0057361 | A1 | 3/2005 | Giraldo et al. |
| 2006/0015342 | A1 | 1/2006 | Kurzweil et al. |
| 2006/0047704 | A1 | 3/2006 | Gopalakrishnan |
| 2006/0074670 | A1* | 4/2006 | Weng et al. ............... 704/257 |
| 2007/0061146 | A1 | 3/2007 | Jaramillo et al. |
| 2007/0208687 | A1 | 9/2007 | O'Conor et al. |
| 2007/0257247 | A1 | 11/2007 | Ando et al. |
| 2008/0104624 | A1 | 5/2008 | Narasimhan |
| 2008/0285578 | A1 | 11/2008 | DeLay |
| 2009/0089263 | A1 | 4/2009 | McHugh et al. |
| 2009/0089658 | A1 | 4/2009 | Chiu et al. |
| 2009/0299957 | A1 | 12/2009 | Ledlie |
| 2009/0313026 | A1* | 12/2009 | Coffman et al. ............. 704/275 |
| 2010/0087175 | A1 | 4/2010 | Roundtree |
| 2010/0174544 | A1 | 7/2010 | Heifets |
| 2010/0201793 | A1 | 8/2010 | Kurzweil et al. |
| 2010/0222098 | A1 | 9/2010 | Garg |
| 2010/0241963 | A1 | 9/2010 | Kulis et al. |
| 2011/0033172 | A1 | 2/2011 | Ando et al. |
| 2011/0092187 | A1 | 4/2011 | Miller |
| 2011/0116610 | A1 | 5/2011 | Shaw |
| 2011/0191303 | A1 | 8/2011 | Kaufman et al. |
| 2011/0208524 | A1 | 8/2011 | Haughay |

OTHER PUBLICATIONS

"BuzzVoice", Retrieved on May 28, 2012, 1 page. Available at: http://www.buzzvoice.com/.

"Infphodrive", Retrieved on May 28, 2012, 1 page. Available at: http://inphodrive.com/.

"Stitcher", Stitcher Smart Radio, Retrieved on May 28, 2012, pp. 1-2. Available at: http://www.stitcher.com/.

"Voice Extensible Markup Language (VoiceXML) 2.1", W3C, Retrieved on May 29, 2012, pp. 1-19. Available at: http://www.w3.org/TR/voicexml21/.

Allen, James, "Natural Language Understanding", Second Edition, ISBN: 0805303340, 1995, pp. 1-5. Also Available at: http://staff.um.edu.mt/mros1/bib/allen.html.

Bernsen, Niels O., "Designing Interactive Speech Systems: From First Ideas to User Testing", Springer, ISBN: 3540760482, 1998.

Cole, Ronald, et al., "Survey of the State of the Art in Human Language Technology", Processing of Studies in Natural Language, v.12-13, 0521592771, Cambridge University Press, 1997, 502 pages.

Gamma, Erich et al., "Design Patterns: Elements of Reusable Object-Oriented Software", Addison-Wesley, 1995, pp. 1-431.

Jurafsky, Daniel, "Speech and Language Processing: An Introduction to Natural Language Processing, Computational Linguistics, and Speech Recognition", Second Edition, Prentice-Hall, ISBN: 0130950696, 2000, 3 pages.

Maier, Elisabeth, et al., "Dialogue Processing in Spoken Language Systems", Lecture Notes in Computer Science, Lecture Notes in Artificial Intelligence, ECAI '96 workshop, Springer, ISBN: 3540631755, Aug. 13, 1996, 8 pages.

Markowitz, Judith, "Using Speech Recognition", Upper Saddle River, N.J., London, Prentice Hall, ISBN: 0131863215, 1996.

Roe, David et al., "Voice Communication Between Humans and Machines", National Academy Press, ISBN: 0309049881, 1994, 33 pages.

Smith, Ronnie et al., "Spoken Natural Language Dialog Systems: A Practical Approach", Oxford University Press, ISBN: 0195091876, 1994, 12 pages.

Young, Steve, "Still Talking to Machines (Cognitively Speaking)", Interspeech, Cambridge University Engineering Department, 2010, pp. 1-10.

* cited by examiner

ACCESSING CONTENT USING A SOURCE-SPECIFIC CONTENT-ADAPTABLE DIALOGUE

BACKGROUND

A variety of human-machine dialogue systems exist for enabling human users to interact with computers. For example, various voice-based web browsers exist that render web pages by using text-to-speech engines to read the content of web pages aloud to human users, and that allow such users to issue navigation commands (such as commands to select links within web pages) by speaking such commands. Such voice web browsers can be particularly useful to users who are blind or otherwise visually disabled.

SUMMARY

A system for accessing content maintains a set of content selections associated with a first user. The system receives first original content from a first content source associated with a first one of the content selections associated with the first user. The system applies, to the first original content, a first rule (such as a parsing rule) that is specific to the first one of the content selections, to produce first derived content. The system changes the state of at least one component of a human-machine dialogue system (such as a text-to-act engine, a dialogue manager, or an act-to-text engine) based on the first derived content. The system may apply a second rule (such as a dialogue rule) to the first derived content to produce rule output and change the state of the human-machine dialogue system based on the rule output.

For example, one embodiment of the present invention is directed to a method comprising: (A) identifying, from among a plurality of content selection data associated with a user, first content selection data associated with the user; (B) identifying a first content source associated with the first content selection data; (C) identifying a first selection-specific rule set associated with the first content selection data; (D) receiving first original content from the first content source; (E) applying the first selection-specific rule set to the first original content to produce first rule output; and (F) changing a state of at least one first component of a human-machine dialogue system based on the first rule output. The at least one first component may, for example, be a text-to-act engine, a dialogue manager, an act-to-text engine, or any combination thereof. The first selection-specific rule set may include at least one parsing rule and/or at least one dialogue rule.

The method may further include: (E) identifying, from among the plurality of content selection data associated with the user, second content selection data associated with the user, wherein the second content selection data differs from the first content selection data; (F) identifying a second content source associated with the second content selection data; (G) identifying a second selection-specific rule set associated with the second content source, wherein the second selection-specific rule set differs from the first selection-specific rule set; (H) receiving second original content from the second content source; (I) applying the second selection-specific rule set to the second original content to produce second rule output; and (J) changing a state of at least one second component of the human-machine dialogue system based on the second rule output. The at least one first component may be the same as or different from the at least one second component.

Operation (A) of the method may include: (A)(1) outputting a first audio stream representing content selection set data, wherein the content selection set data represents the plurality of content selection data associated with the user; and (A)(2) receiving, from the user, first user input indicating the first content selection data associated with the user. Operation (A) may further include: (A)(3) before (A)(1), providing, to a selection server that is functionally independent of the content source, a first request for the content selection set data; and (A)(2) before (A)(1), receiving, from the selection server, the content selection set data. The content selection set data may include the first content selection data, and the first content selection data may include the first selection-specific rule. The content selection set data may further include second content selection data associated with the user, wherein the second content selection data is associated with a second content source that differs from the first content source; and the second content selection data may include a second selection-specific rule that differs from the first selection-specific rule.

Operation (B) of the method may include: (B)(1) identifying the first content source associated with the first content selection data based on the first user input indicating the first content selection data.

The first user input may include voice input representing first speech of the user. The human-machine dialogue system may include a plurality of components including a speech-to-text engine, a text-to-act engine, a dialogue manager, an act-to-text engine, and a text-to-speech engine; the plurality of components may include the at least one component; and the method may further include: (G) applying the speech-to-text engine to the voice input to produce first text; (H) applying the text-to-act engine to the first text to produce first act data; (I) applying the dialogue manager to the first act data to produce first response act data; (J) applying the act-to-text engine to the first response act data to produce second text; (K) applying the text-to-speech engine to the second text to produce speech data representing second speech; and (L) producing audio output representing the speech data. The at least one first component may include at least one of the text-to-act engine, the dialogue manager, and the act-to-text engine. Operation (A)(2) of the method may include receiving the first user input from the user via an input component of a user device; and the user device may include the human-machine dialogue system.

The first selection-specific rule set may include a first parsing rule associated with the first content selection; and (E) may include: (E)(1) applying the first parsing rule to the first original content to produce first derived content; (E)(2) identifying a first dialogue rule associated with the first content selection; and (E)(3) applying the first dialogue rule to the first derived content to produce the first rule output.

Operation (D) of the method may include: (D)(1) identifying first authentication data associated with the user and the first content source; (D)(2) authenticating the user at the first content source using the first authentication data; and (D)(3) receiving the first original content from the first content source after authenticating the user at the first content source. The method may further include: (G) identifying, from among the plurality of content selection data associated with the user, second content selection data associated with the user, wherein the second content selection data differs from the first content selection data; (H) identifying a second content source associated with the second content selection data; (I) identifying a second selection-specific rule set associated with the second content selection data; and (J) receiving second original content from the second content source, comprising: (J)(1) identifying second authentication data associated with the user and the second content source, wherein the second authentication data differs from the first authentication data; (J)(2) authenticating the user at the second content source using the second authentication data; and (J)(3) receiving the second original content from the second content source after authenticating the user at the second content source.

The first selection-specific rule set may consist of a single selection-specific rule, or include a plurality of selection-specific rules.

Other features and advantages of various aspects and embodiments of the present invention will become apparent from the following description and from the claims.

DETAILED DESCRIPTION

Figure 1:
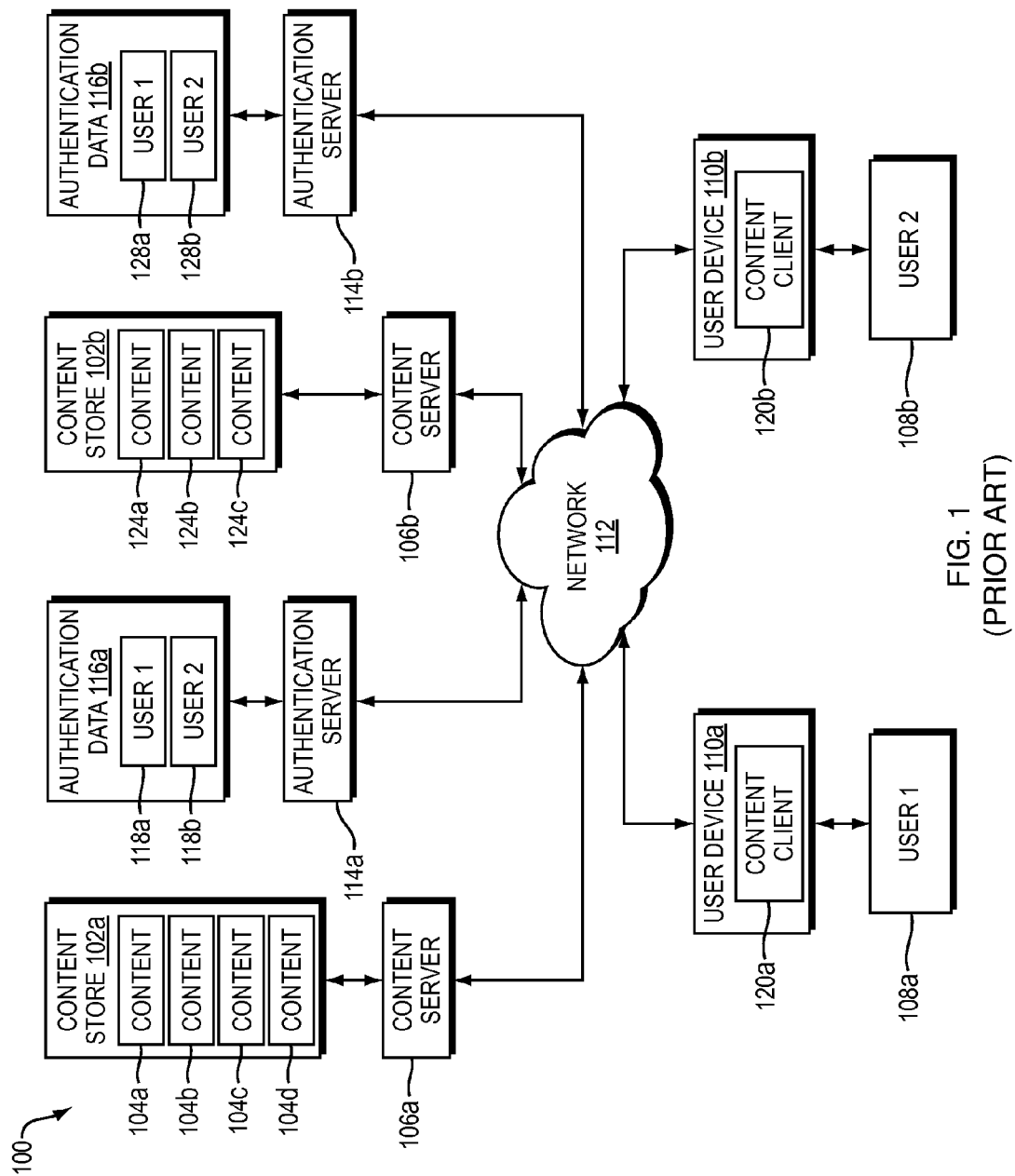
FIG. 1 is a diagram of a prior art system for enabling users to access content.

Referring to FIG. 1, a diagram is shown of a prior art system 100 for enabling users to access content. The system includes a plurality of content stores 102a and 102b, which contain contents 104a-d and 124a-c, respectively. Although only two content stores 102a-b are shown in FIG. 1 for ease of illustration, the system 100 may include any number of content stores, each of which may contain any number or type of units of content.

Content store 102a is served by content server 106a; content store 102b is served by content server 106b. As a result, a first user 108a may access (e.g., read from and/or write to) content store 102a by using a first user device 110a as a client to interact with content server 106a. For example, user 108a may use client device 110a to transmit a read request over network 112 (e.g., the Internet) to content server 106a. The read request may specify one or more specific units of content 104a-d (or parts thereof) to read. In response to receiving such a request, the content server 106a may provide the requested content (or data derived therefrom) to the user device 110a over the network 112. Content server 106a may process requests to write data to the content store 102a similarly.

Similarly, the user 108a may use user device 110a to read content from and write content to the content store 102b, via the corresponding content server 106b. Similarly, the second user 108b (and any number of additional users) may read content from and write content to the content stores 102a-b via the corresponding content servers 106a-b, respectively.

The system 100 may be used to enable users to access any of a variety of types of content. For example, the content in the content stores 102a-b may be web content (e.g., content containing HTML, XML, Java, JavaScript, ActiveX, or other code), email content, text message content, or voicemail content. Such content may, for example, be served by a web server, RSS server, mail server, or other server. As another example, the content in the content stores 102a-b may be content accessible via non-Internet protocols by devices lacking Internet access capabilities. For example, the content in the content stores 102a-b may be information about the content (e.g., titles and artists) of songs stored on CDs or received by a radio, in which case such information may be received by a remote control using non-Internet wireless protocols.

As another example, the content in the content stores 102a-b may be content stored in a database and accessible via a remote database protocol. As another example, the content in the content stores 102a-b may be content on a remote computer's file system and accessible via the remote file system protocol. As another example, the content in the content stores 102a-b may be content accessible via dual-tone multi-frequency (DTMF) tones. Although in certain examples disclosed herein the network 112 is described as the Internet, this is not a requirement of the present invention. More generally, the network 112 may be any network, such as a corporate intranet, in which case the content in the content stores 102a-b may be content stored on corporate computers and accessible within the corporation via the corporate intranet.

The client devices 110a-b may be any type(s) of device(s) capable of acting as clients for the content servers 106a-b, such as desktop computers, laptop computers, personal digital assistants (PDAs), smartphones, or tablet computers. Such devices may include client software (such as email client software, web browser software, or text messaging client software) that performs the functions described herein. For example, in the system 100 of FIG. 1, client device 110a includes a content client 120a that is capable of acting as a client in connection with content servers 106a-b. Similarly, client device 110b includes a content client 120b that is capable of acting as a client in connection with content servers 106a-b. Although not shown in FIG. 1, each of user devices 110a-b may include multiple content clients, such as an email client and a web client (browser), for acting as clients in connection with different content servers. Clients 120a-b may include any hardware, software, or both hardware and software.

Devices 110a-b may include or work in conjunction with any kind of input devices (such as keyboards, mice, touchpads, touchscreens, and microphones) and any kind of output devices (such as monitors, touchscreens, printers, and speakers).

A content source may require some or all users to be authenticated before the content source allows the user to access content served by the content source. In the example system 100 of FIG. 1, content store 102a and content store 102b both require such authentication. As will be described in more detail below, however, embodiments of the present invention may operate in connection with content sources that do or do not require authentication. As a result, the authentication systems shown in FIG. 1 are not required for the system 100 of FIG. 1 to be used in connection with embodiments of the present invention.

In the example system 100 of FIG. 1, authentication server 114a enforces user authentication in connection with access to content store 102a. More specifically, authentication data 116a contains user credentials 118a and 118b, corresponding to users 108a and 108b, respectively. For example, user credentials 118a may include a username and password associated with user 108a's rights to access content in content store 102a, while user credentials 118b may include a username and password associated with user 108b's rights to access content in content store 102a. As a result, user 108a may be required to provide data matching the user's credentials 118a to the authentication server 114a before the authentication server 114a allows the user 108a to access content in the content store 102a. Upon receiving the data from the user 108a, the authentication server 114a may compare the user-supplied data to the credentials 118a in the authentication data 116a to determine whether the user-supplied data matches the credentials, and only allow the user 108a to access content in the content store 102a if the user-supplied data matches the credentials 118a. Similar techniques may be applied to control access by user 108b to content in the content store 102a, and to control access by users 108a-b to content in the content store 102b (via authentication server 114b, which uses credentials 128a-b in authentication data 116b to control access to the content store 102b).

Figure 2:
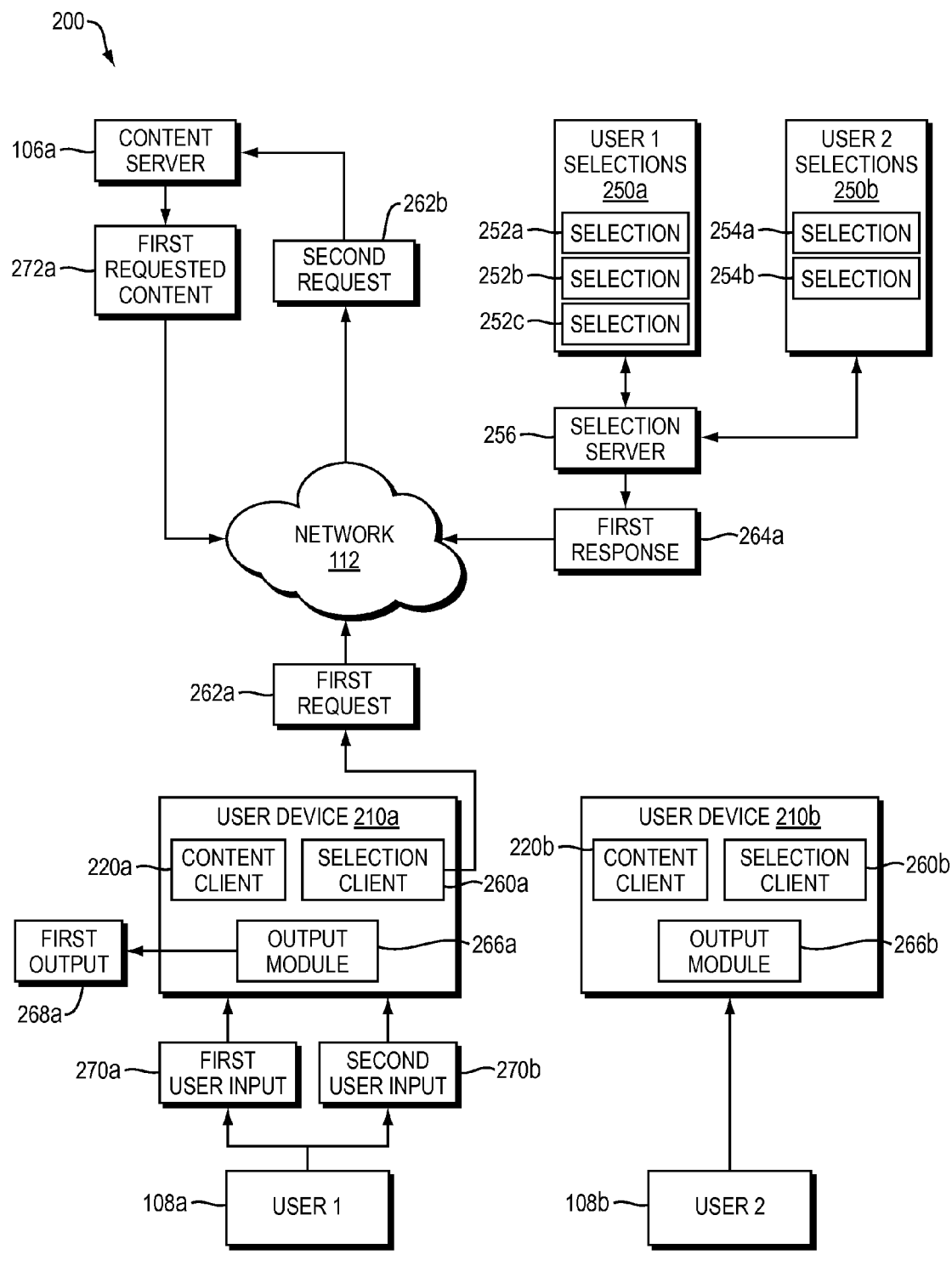
FIG. 2 is a dataflow diagram of a system for accessing content according to one embodiment of the present invention.

Referring to FIG. 2, a dataflow diagram is shown of a system 200 implemented according to one embodiment of the present invention. The system 200 may be used by or on behalf of one or more users, such as users 108a-b. The system 200 includes a first set 250a of content selection data associated with user 108a and a second set 250b of content selection data associated with user 108b. Because each of the sets 250a and 250b contains content selection data, each of the sets 250a and 250b are referred to as "content selection set data" herein. Although only two sets 250a-b of content selection data are shown in FIG. 2 for purposes of example, the system 200 may include any number (i.e., one or more) of sets of content selection data. Content selection set data 250a may include one or more units of content selection data associated with user 108a; in the example of FIG. 2, content selection set 250a includes three units of content selection data 252a-c associated with user 108a. Similarly, content selection set 250b may include one or more units of content selection data associated with user 108b; in the example of FIG. 2, content selection set 250b includes two units of content selection data 254a-b associated with user 108b. As this example illustrates, different numbers of units of content selection data may be associated with different users.

In general, a particular unit of content selection data associated with a particular user indicates that content from a particular source of content is to be made available to the particular user using techniques employed by embodiments of the present invention. As a concrete example, a particular unit of content selection data associated with a particular user may represent a web site by its address (i.e., URL), and thereby indicate that web content from the web site is to be made available to the particular user using techniques employed by embodiments of the present invention. A "selection" of particular content by a particular user may, therefore, operate in at least some ways that are similar to a subscription by the particular user to the particular content. For example, once a particular user has made a selection of particular content, such as by selecting a URL at which the particular content is available, embodiments of the present invention may make content associated with such a selection available to the user over time, even as that content changes, such as by obtaining content from the selected URL and providing the obtained content to the user.

As the description above indicates, each unit of the content selection data 252a-c and 254a-b is associated with a corresponding content source. In general, a content source is any system that provides collections of related content to users. As an example, consider the content selections 252a-c associated with user 108a. Content selection 252a may be associated with a first content source, content selection 252b may be associated with a second content source, and content selection 252c may be associated with a third content source. The first, second, and third content sources may differ from each other.

Next consider the content selections 254a-b associated with user 108b. Content selection 254a may be associated with a fourth content source, while content selection 254b may be associated with a fifth content source. The fourth and fifth content sources may differ from each other.

The content selections associated with different users may be the same as or differ from each other. For example, the content selection 252a may be associated with a content source that is not associated with any of the content selections 254a-b in selection set 250b. As another example, content selection 252a may be associated with the same content source as content selection 254a or 254b.

The sets 250a-b content selection data that are associated with users 108a-b may be generated in any of a variety of ways. For example, user 108a may be provided with an opportunity to provide input that specifies the selections to be associated with the user 108a. Such input may take any of a variety of forms. For example, the user 108a may provide such input orally in a telephone call, in response to which the user's oral selections may be transcribed (automatically and/or manually) to generate the selection data 252a-c associated with the user 108a. As another example, the user 108a may provide such input on a paper form, or through any computer-based input mechanism, such as by typing text representing the selections into a web page or email message, or by selecting the selections from a dropdown list. However the user 108a provides such input, the content selection set data 250a associated with the user 108a may be populated with selection data 252a-c that represent the input provided by the user 108a. The same techniques may be used to generate the content selection set data 250b associated with user 108b and with any number of additional users.

The content selections associated with a particular user may be a subset of a larger set of data associated with the user and accessible via the selection server. More generally, for example, the selection server 256 may maintain and make accessible (via selection clients 260a-b) an account, referred to herein as a "selection account," for each of the users 108a-b. Although not shown in FIG. 2 for ease of illustration, the selection account for user 108a may include, for example, the user selection data 250a and other data associated with user 108a, such as user 108a's real name, mailing address, email address, and a username and password that are associated with user 108a and that user 108a must provide to the selection server 256 to access the user's selection data 250a and other data in user 108a's selection account. The selection account for user 108b may have data associated with user 108b that has the same structure as the data just described for the selection account of user 108a.

The selection client 260a may transmit data identifying user 108a (such as user 108a's selection account username and password) to the selection server 256 when making a request to the selection server 256, thereby enabling the selection server 256 to associate the request with user 108a's selection account so that the selection server 256 may respond to the request with data from user 108a's selection account. The selection client 260b may operate similarly when communicating with selection server 256 to transmit and receive data associated with user 108b.

Figure 4A:
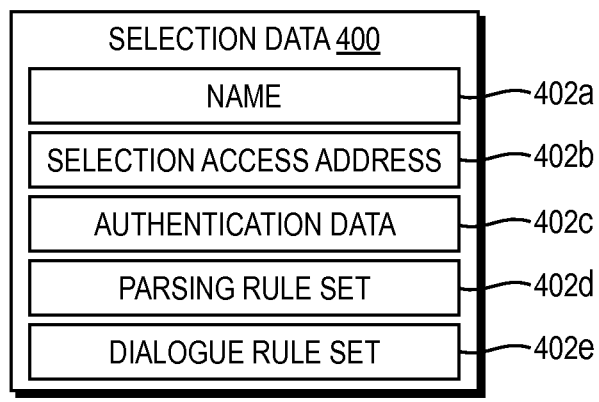
FIG. 4A is a diagram of a data structure for implementing selection data according to one embodiment of the present invention.

Each unit of the selection data 252a-c and 254a-b may include any of a variety of data. For example, referring to FIG. 4A, a diagram is shown of a data structure 400 that may be used to implement one or more of the units of selection data 252a-c and 254a-b. For example, each unit of selection data 252a-c and 254a-b may have the structure 400 shown in FIG. 4A. Note, however, that the structure 400 of FIG. 4A is merely an example and not a limitation of the present invention. Units of selection data implemented according to embodiments of the present invention need not contain all of the data elements shown in FIG. 4A, and may contain data elements in addition to those shown in FIG. 4A. In the example of FIG. 4A, the data structure 400 includes data representing:

- a name 402a of the corresponding selection, such as a text string representing a human-readable name of the corresponding selection (e.g., "New York Times");
- a selection access address 402b (e.g., URL) at which content associated with the corresponding selection is located;
- authentication data 402c for the corresponding user at the content source associated with the corresponding selection;
- a set 402d of one or more parsing rules associated with the corresponding selection; and
- a set 402e of one or more dialogue rules associated with the corresponding selection.

The authentication data 402c may, for example, be authentication data 116a-b of the kind described above in connection with FIG. 1. For example, the authentication data in selection data 252a may be a copy of the authentication data 118a that is required for user 108a to access content in content store 102a, while the authentication data in selection data 252b may be a copy of the authentication data 128a that is required for user 108a to access content in content store 102b. Similarly, the authentication data in selection data 254a may be a copy of the authentication data 118b that is required for user 108b to access content in content store 102a, while the authentication data in selection data 254a may be a copy of the authentication data 128b that is required for user 108b to access content in content store 102b.

The term "rule," as used herein in connection with parsing rules and dialogue rules, is not limited to any particular kind of rule. For example, rules may include inference rules, probabilistic rules, and stochastic rules. Parsing rules and dialogue rules may include any one or more such kinds of rules.

In general, parsing rules may be used to transform text and/or other content into a form that is more easily processable by embodiments of the present invention. For example, parsing rules may perform any one or more of the following functions:

- removing, from the original content 272a, data that is not of interest to the user or that should not be output to the user, such as headers, footers, page navigation links, and embedded advertisements;
- modifying content to make it more suitable for output by a text-to-speech engine (e.g., removing the dashes from the text "text-to-speech" so that such dashes are not spoken by the text-to-speech engine); and
- normalizing content (such as by formatting all dates in a standard data format, such as "MONTH DAY YEAR").

The parsing rules contained within (or otherwise associated with) a particular unit of selection data may differ from the parsing rules contained within (or otherwise associated with) another unit of selection data. As this implies, the parsing rules associated with one content source (e.g., content store 102a) may differ from the parsing rules associated with another content source (e.g., content store 102b). For example, the parsing rules contained within selection data 252a (associated with content store 102a) may differ from the parsing rules contained within selection data 252b (associated with content store 102b).

Similarly, the dialogue rules contained within (or otherwise associated with) a particular unit of selection data may differ from the dialogue rules contained within (or otherwise associated with) another unit of selection data. As this implies, the dialogue rules associated with one content source (e.g., content store 102a) may differ from the dialogue rules associated with another content source (e.g., content store 102b). For example, the dialogue rules contained within selection data 252a (associated with content store 102a) may differ from the dialogue rules contained within selection data 252b (associated with content store 102b).

Users 108a-b may, for example, interact with the system 200 using devices 210a-b, respectively. Aspects of devices 210a-b in FIG. 2 may, for example, be implemented in the same way as devices 110a-b, respectively, in FIG. 1. For example, devices 210a-b in FIG. 2 may include content clients 220a-b, which may be implemented in the same way as content clients 120a-b in FIG. 1. For example, content clients 220a-b may be conventional web browsers. Content clients 220a-b may, however, be implemented in any way to perform the functions disclosed herein.

The system 200 may also include a selection server 256. Devices 210a-b may include selection clients 260a-b, respectively, for interacting with selection server 256. In particular, the selection server 256 may be used to access (e.g., create, write data to, or read data from) the content selection set data 250a-b. For example, the selection server 256 may receive a request from one of the selection clients 260a-b to read particular data from a specified one of the sets 250a-b of content selection data and, in response to the request, read the requested data from the specified set of content selection data and provide the requested data (e.g., over network 112) to the requesting one of the selection clients 260a-b. Similarly, the selection server 256 may receive a request from one of the selection clients 260a-b to write particular data to a specified one of the sets 250a-b of content selection data and, in response to the request, write the requested data to the specified set of content selection data.

The selection server 256 may be functionally independent of the content server 106a and of any other sources of content associated with the content selection set data 250a-b. The selection server 256 may, for example, be implemented on a different machine than the content sources associated with data 250a-b. As another example, the selection server 256 may perform the functions disclosed herein without communicating with the content sources associated with data 250a-b; instead, selection clients 260a-b may communicate with such content sources. As yet another example, selection server 256 may lack the means (e.g., content clients 220a-b) necessary to communicate with the content sources associated with data 250a-b. As yet another example, data 250a-b may be stored distinctly from (e.g., in different storage devices than) the content associated with data 250a-b.

Having described various components of the system 200 of FIG. 2, particular techniques that may be performed by the system 200 of FIG. 2 will now be described in connection with both FIG. 2 and the flowchart of FIGS. 3A-3B, which illustrate a method 300 that may be performed by the system 200 of FIG. 2 according to one embodiment of the present invention. The method 300 may be performed in connection with any of the users 108a-b of the system 200. For purposes of example, however, the method 300 will be described in connection with user 108a.

The selection client 260a of the device 210a associated with user 108a provides, to the selection server 256 (e.g., over network 112), a first request 262a for some or all of the content selection set data 250a associated with the user 108a (operation 302). The request 262a, therefore, is a request for data representing one or more of the selections associated with user 108a. The request 262a may, for example, be a request for the entire set 250a of content selection data associated with user 108a, or a request for a subset of the set 250a of content selection data.

The selection server 256 receives the request 262a (operation 304). In response to receiving the request 262a, the selection server 256 retrieves the requested selection data (e.g., some or all of the content selection data set 250a) and provides, to the client 210a (e.g., over network 112), the retrieved selection data in the form of a first response 264a (operation 306). As is evident from FIGS. 2 and 4, the first response 264a may include any one or more of the elements shown in FIG. 4A. The response 264a may, therefore, include any one or more of the following: a human-readable name of the requested selection, an address (e.g., URL of the requested selection), authentication data associated with the user 108a and the requested selection, at least one parsing rule associated with the requested selection, and at least one dialogue rule associated with the requested selection.

The selection client 260a receives the first response 264a from the selection server 256 (operation 308). The selection client 260a may store a local copy (e.g., on the client device 210a or a storage device connected thereto) of the first response 264a. As a result, the client device 210a may contain a local copy of some or all of user 108a's selection data 250a. Therefore, any description herein of operations performed on user 108a's selection data should be understood to refer to operations performed on either or both of such selection data as stored at the selection server 256 or in client device 210a.

The selection client 260a produces first output 268a based on the first response 264a (operation 310). The first output 268a may, for example, be a first audio stream produced by providing the first response (or data derived therefrom) to a text-to-speech engine or other output module 266a. The first output 268a may, as an example, be or include audio output produced by speakers. The first output 268a may, for example, represent some or all of the selection data 252a-c in the selection set 250a associated with the user 108a.

For example, the first output 268a may be a spoken list of the human-readable names (stored in field 402a in the data structure 400 of FIG. 4A) of the selection data 252a-c. The first output 268a may include data in addition to the data contained in the selection set 250a. For example, the first output 268a may include a unique number or other identifier for each unit of selection data 252a-c. As another example, the first output 268a may include background information or instructions for responding to the first output 268a. An example would be a spoken list representing the following content: "For New York Times say 1, for Boston Globe say 2, for Washington Post say 3."

The first output 268a may, however, take forms other than speech, such as text displayed on a monitor or other output device, or Braille output by a Braille reader. Any such output may include any of the information described above.

The user 108a provides first user input 270a indicating one of the selections represented by the first output 268a. In other words, the first user input 270a indicates one of the selections represented by user 108a's content selection data set 250a. The selection client 260a receives the first user input 270a (operation 312). The first user input 270a may take any of a variety of forms. For example, the first user input 270a may be voice input provided by the user 108a through a microphone or other voice input device (e.g., speech representing the words "New York Times" or "one"). Such voice input may be transcribed by a speech-to-text engine (also known as an automatic speech recognition (ASR) engine) to produce text or other output representing the user's speech. Therefore the first input 270a may be the user's speech or any text, audio data, or other data derived from such speech.

The first user input 270a may, however, take other forms. For example, the first user input 270a may include text input, mouse input, touchscreen input, or touchpad input.

Figure 5:
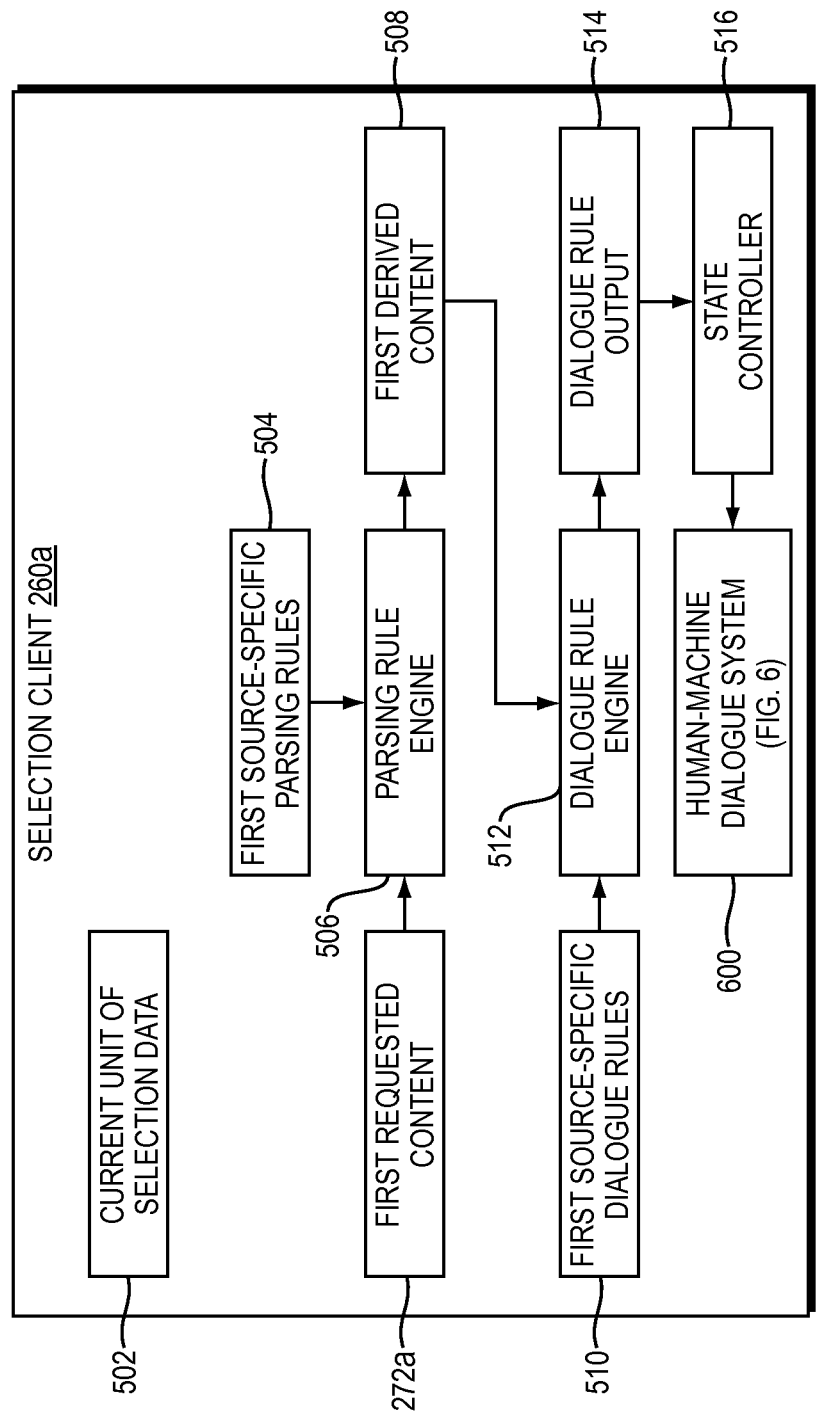
FIG. 5 is a dataflow diagram of a system for modifying the state of a human-machine dialogue system according to one embodiment of the present invention.

The selection client 260a identifies a first content source associated with the particular selection indicated by the user 108a in the first user input 270a (operation 314). The selection client 260a may make the identification in operation 314 in any of a variety of ways. For example, the selection client 260a may use the locally-stored copy of user 108a's selection data 250a to identify the first content source. For example, if the first user input 270a represents the words "New York Times," the selection client 260a may search within the locally-stored copy of the selection set 250a for a unit of selection data in which the content of the name field 402a is "New York Times." If the selection client 260a finds a matching unit of selection data, the selection client 260a may identify the address stored in the selection access address field 402b of that unit of selection data as the address of the first content source. This unit of selection data will be referred to herein as the "current unit of selection data" for ease of reference. As shown in FIG. 5, the selection client 260a may store a copy of, pointer to, or other data representing the current unit of selection data 502.

Assume, merely for purposes of example, that the first content source identified in operation 314 is the content server 106a of FIG. 1. The selection client 260a provides (e.g., over network 112), to the first content source (e.g., content server 106a), a second request 262b for the particular selection indicated by the user 108a in the first user input 270a (operation 316).

The first content source (e.g., first content server 106a) receives the second request 262b and, in response, provides the requested content 272a (e.g., over network 112) to the selection client 260a (operation 318), which receives the requested content 272a (operation 320).

The selection client 260a identifies one or more source-specific parsing rule(s) 504 associated with the first content source (operation 322). The selection client 260a may, for example, identify such source-specific parsing rules 504 as the parsing rules contained within the current unit of selection data 502. A parsing rule engine 506 in the selection client 260a applies, to the content 272a received from the first content source, the source-specific parsing rules 504 associated with the first content source, thereby producing first derived content 508 (operation 324).

The selection client 260a may identify one or more source-specific dialogue rule(s) 510 associated with the first content source (operation 326). The selection client may, for example, identify such source-specific dialogue rules 510 as the dialogue rules contained within the current unit of selection data 502. A dialogue rule engine 512 in the selection client 260a may apply, to the first derived content 508, the source-specific dialogue rules 510 associated with the first content source, thereby producing first dialogue rule output 514 (operation 328). In general, the dialogue rules may be any rules that may be used to modify the state of the human-machine dialogue system 600, either directly (e.g., by the dialogue rule engine 512) or indirectly (e.g., by the state controller 516).

The description above states that parsing rules identified by operation 322 and the dialogue rules identified by operation 326 are "source-specific." A source-specific rule is a rule that is associated with a particular content source and which therefore may be applied to content from the particular content source, or data derived from such content (as evidenced by operations 324 and 328). Therefore, if a first source-specific rule is associated with a first content source and a second source-specific rule is associated with a second content source, where the first content source differs from the second content source, then the first source-specific rule may differ from the second source-specific rule. In this case, the rule that is applied to content from the first content source (i.e., the first source-specific rule) may differ from the rule that is applied to content from the second content source (i.e., the second source-specific rule).

It is not required, however, that different source-specific rules be applied to different content sources. For example, if a first source-specific rule is associated with a first content source and a second source-specific rule is associated with a second content source, the first source-specific rule and the second source-specific rule may be the same as each other (i.e., have the same logical content as each other). In embodiments of the present invention, however, given any set of source-specific rules associated with a plurality of content sources, at least two of the source-specific rules must differ from each other.

The selection client 260a is not required to apply both the parsing rules 504 and the dialogue rules 510 associated with the first content source. The selection client 260a may, for example, apply only the parsing rules 504 associated with the first content source but not the dialogue rules 510 associated with the first content source. Alternatively, for example, the selection client 260a may apply only the dialogue rules 510 associated with the first content source but not the parsing rules 504 associated with the first content source. As a result, any reference herein to operations that are performed on the dialogue rule output 514 should be understood alternatively to apply to the first derived content 508 or to the dialogue rule output 514 even if such output resulted from applying the source-specific dialogue rules 510 directly to the first content 272a rather than to the first derived content 508.

In general, therefore, embodiments of the present invention apply at least one selection-specific rule (which may include one or both of a selection-specific parsing rule and a selection-specific dialogue rule) to original content associated with a first selection to produce derived content. The state of a human-machine dialogue system is then changed based on the derived content. The same techniques may be used to apply other selection-specific rules, associated with other selections, to other original content associated with those other selections to produce other derived content.

Figure 6:
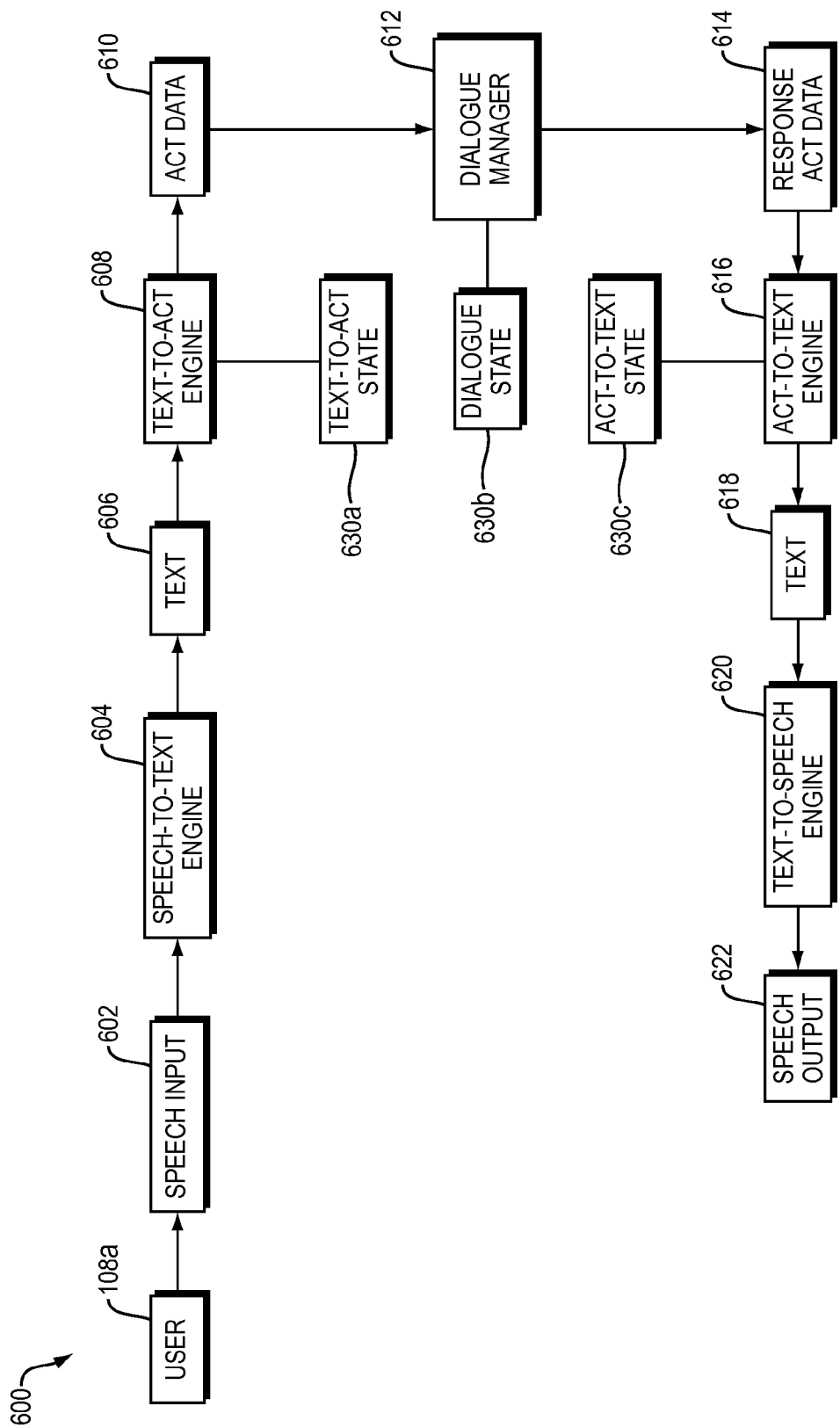
FIG. 6 is a dataflow diagram of a human-machine dialogue system according to one embodiment of the present invention.
Figure 7:
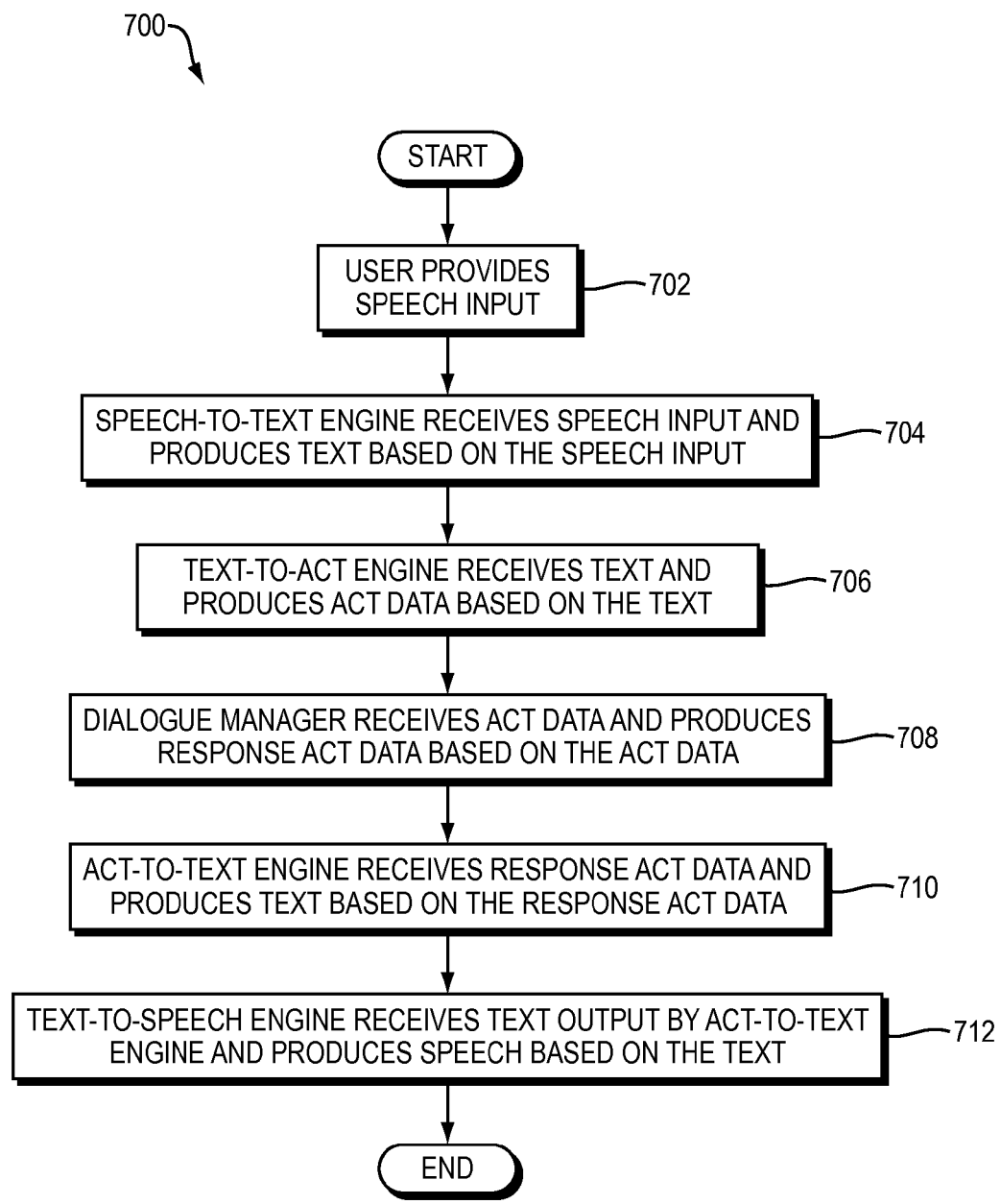
FIG. 7 is a flowchart of a method performed by the human-machine dialogue system of FIG. 6 according to one embodiment of the present invention.

Before describing the remainder of the method 300 of FIGS. 3A-3B, the system 600 of FIG. 6 and corresponding method 700 of FIG. 7 will be described. Although the system 600 of FIG. 6 is illustrated distinctly from the system 500 of FIG. 5, some or all of the system 600 of FIG. 6 may be implemented within the system 500 of FIG. 5 (i.e., within the selection client 260a) or otherwise within the client device 210a. In the system 600 of FIG. 6, a user (such as user 108a) provides speech input 602, such as by speaking into a microphone that is contained within or connected to the client device 210a (operation 702). A speech-to-text engine 604 in the system 600 receives the speech input 602 and produces text 606 based on the speech input 602 (operation 704). The text 606 may, for example, be a literal or non-literal transcript of the speech input 602.

A text-to-act engine 608 in the system 600 receives the text 606 and produces act data 610 based on the text 606 (operation 706). As is well-known to those having ordinary skill in the art, the act has a name (e.g., "greeting") and a value (e.g., "hello").

A dialogue manager 612 in the system 600 receives the act data 610 and produces response act data 614 based on the act data 610 (operation 708). For example, if the act data 610 represents a "greeting" act, the response act data 614 generated by the dialogue manager 612 may represent a "greeting response" act (e.g., with a value of "hello, how may I help you?") that responds to the "greeting" act represented by greeting act data 610.

An act-to-text engine 616 in the system 600 receives the response act data 614 and produces text 618 based on the response act data 614 (operation 710). For example, if the response act data 614 represents a "greeting response" act with a value of "hello, how may I help you?", then the text 618 may be the text "hello, how may I help you?".

Finally, a text-to-speech engine 620 in the system 600 receives the text 618 and produces speech 622 based on the text 618 (operation 712). For example, if the text 618 is the text, "hello, how may I help you?", then the speech 622 may be the spoken words, "hello, how may I help you?". The system 600 may output the speech 622 to the user 108a who provided the speech input 602.

Individual components of the system 600 may have their own associated states. For example, the text-to-act engine 608 may have its own associated state 630a, the dialogue manager 612 may have its own associated state 630b, and the act-to-text engine 616 may have its own associated state 630c. For example, if the set of speech acts changes, then the text-to-speech engine 620 may change the mechanism that it uses to decide which act was selected by the user 108a, the dialogue manager 612 may change its dialogue state machine, and the speech-to-text engine 604 may change which utterances are selected for the new set of acts. All of these are examples of changes in state.

Returning to FIGS. 2, 3, and 5, the system 500 may include a state controller 516. Assume that at a first point in time the human-machine dialogue system 600 of FIG. 6 is in an original state, represented by the states 630a-c of the text-to-act engine 608, the dialogue manager 612, and the act-to-text engine 616. The state controller 516 may change a state of at least one component of the human-machine dialogue system 600 of FIG. 6 based on the first dialogue rule output 514 (operation 330). As a result, the human-machine dialogue system 600 of FIG. 6 is in a modified state that differs from the original state. For example, the state controller 516 may change any one or more of the text-to-act engine state 630a, the dialogue manager state 630b, and the act-to-text engine state 630c based on the dialogue rule output 514.

The state controller 516 may receive inputs in addition to the dialogue rule output 514. For example, the state controller 516 may also receive either or both of the first requested content and the first derived content 508 as inputs. The state controller 516 may change the state of at least one component of the human-machine dialogue system 600 based on any one or more of the inputs received by the state controller 516. As a simple example, the state controller 516 may change the state 630*a* of the text-to-act engine 608 based on the first requested content 272*a*, such that the text-to-act engine 608 may interpret the speech input 602 as speech that specifies content within the first requested content 272*a* (e.g., a headline among multiple headlines in the first requested content 272*a*).

"Changing" a particular state refers herein to modifying the particular state to cause it to have a new value that differs from its previous value. For example, assume that a particular state at a first point in time is represented by a first binary number, possibly as the result of serializing data representing the particular state at the first point in time. Changing the particular state involves modifying the particular state so that, once the particular state has been modified, at a second point in time the particular state may be represented by a second binary number (possibly as the result of serializing data representing the particular state at the second point in time) that differs from the first binary number.

The selection client 260*a* receives, from the user 108*a*, second user input 270*b* (operation 332). The second user input 270*b* may take any of the forms described above for the first user input 270*a*, such as voice input. The following description assumes that the second user input 270*b* is or includes voice input.

The second user input 270*b* is an example of the speech input 602 in FIG. 6. The selection client 260*a* applies the speech-to-text engine 604 to the second user input 270*b* to produce text 606 (operation 334). The selection client 260*a* applies the text-to-act engine 608 (which may be in a modified state as a result of operation 330, above) to the text 606 to produce act data 610 (operation 336). The selection client 260*a* applies the dialogue manager 612 (which may be in a modified state as a result of operation 330, above) to the act data 610 to produce response act data 614 (operation 338). The selection client 260*a* applies the act-to-text engine 616 to the response act 614 to produce text 618 (operation 340). Finally, the selection client 260*a* applies the text-to-speech engine 620 to the text 618 to produce speech 622, i.e., audio output representing the response of the dialogue manager 612 to the second user input 270*b* (operation 342).

Figure 3A:
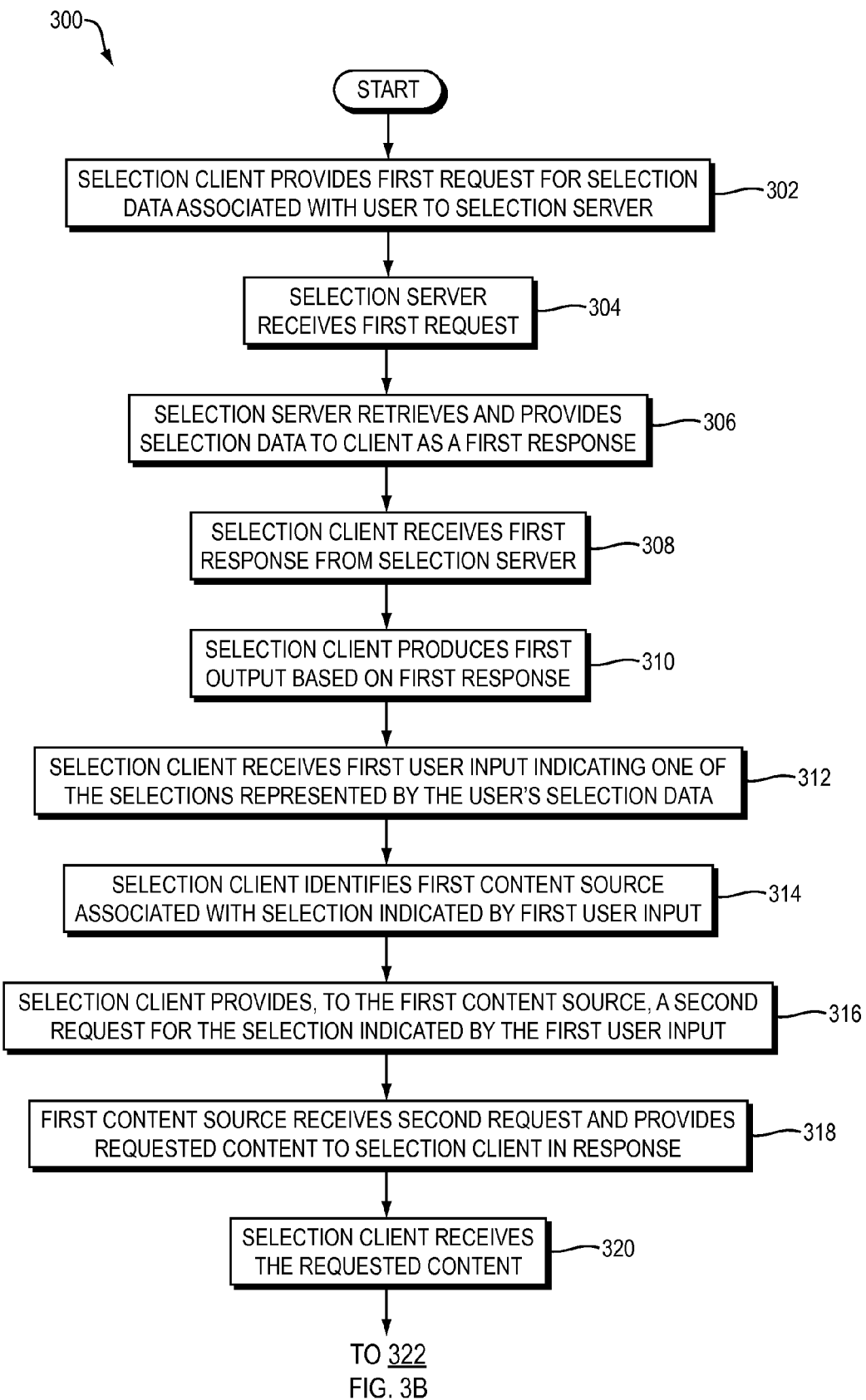
FIGS. 3A-3B are flowcharts of a method performed by the system of FIG. 2 according to one embodiment of the present invention.
Figure 3B:
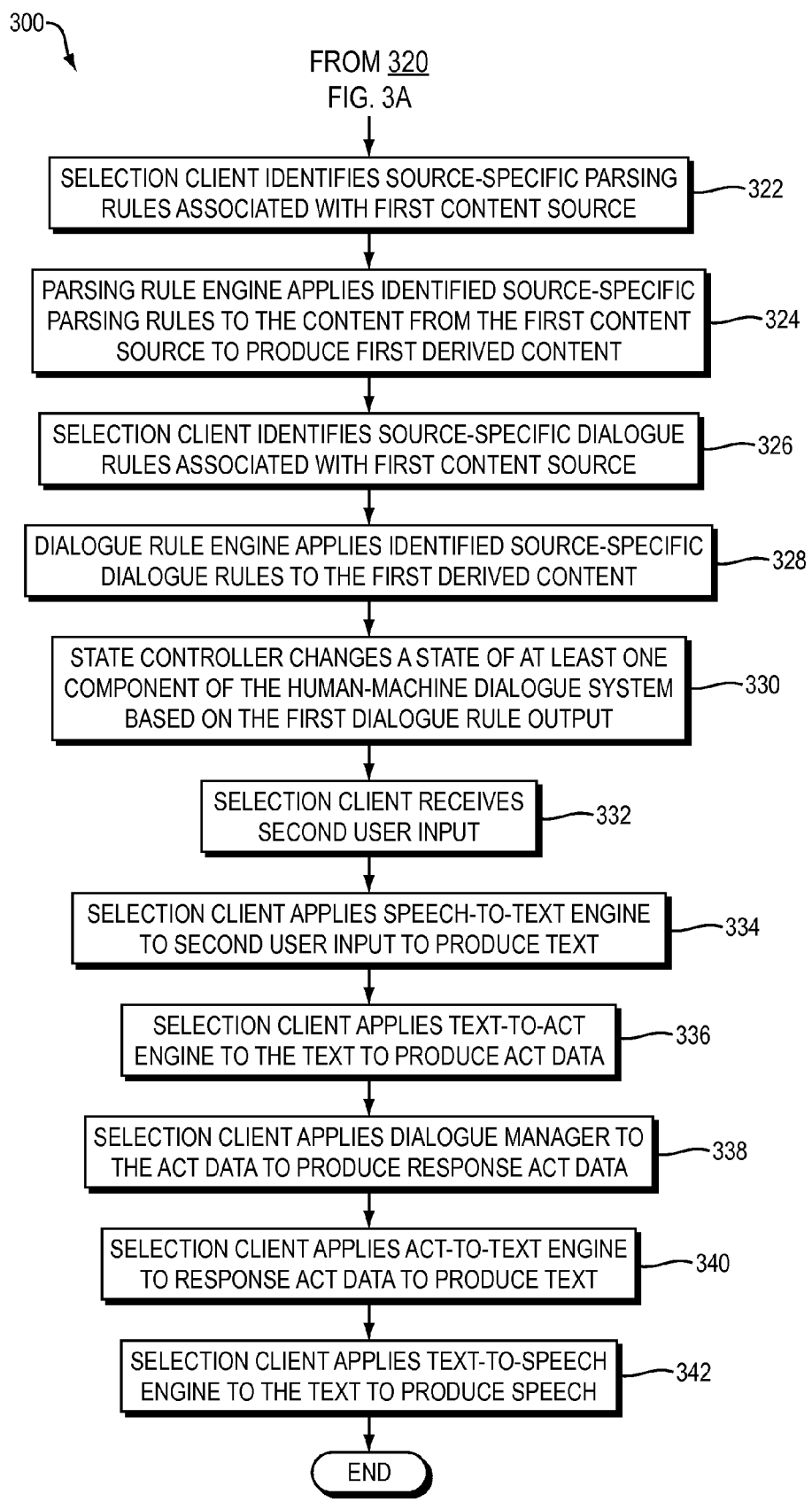

The method 300 of FIGS. 3A-3B may be repeated any number of times and thereby applied to additional speech input provided by the user 108*a*.

The description above states that the selection client 260*a* provides the second request 262*b* to the content server 106*a* for content within the selection indicated by first user input 270*a*. As described above in connection with FIG. 1, however, the content server 106*a* may require users to be authenticated before the content server 106*a* will provide content to such users. The selection client 260*a* may, therefore, first authenticate the user 108*a* to the content server 106*a* before, or as part of, requesting the first requested content 272*a* from the content server 106*a*. In particular, the second request 262*b* may include the first user 108*a*'s authentication data for the first content server 106*a*.

For example, once the selection client 260*a* has identified the current unit of selection data 502 (FIG. 5), the selection client 260*a* may identify the authentication data 402*c* within the current unit of selection data 502. This authentication data 402*c* is authentication data for authenticating user 108*a* at content server 106*a*. Therefore, the selection client 260*a* may use such authentication data 402*c* to authenticate the user 108*a* at the content server 106*a*. The selection client 260*a* may, for example, use conventional authentication techniques to perform such authentication, which may include transmitting the authentication data 402*c* within the current unit of selection data 502 to the content server 106*a*, e.g., as part of the second request 262*b*. The selection client 260*a* may, for example, use authentication mechanisms within the content client 220*a* to authenticate the user 108*a* at the content server 106*a*. Once the authentication of the user 108*a* at the content server 106*a* has been completed successfully, the selection client 260*a* may request and obtain content 272*a* from the content server 106*a* as described above. As this example implies, the selection client 260*a* may use different authentication data to authenticate the same user 108*a* at different content servers.

In the embodiments described above, the content server provides the first requested content 272*a* in response to the second request 262*b*. The first requested content 272*a* may, for example, be the ultimate content desired by the user 108*a*, such as the text of a newspaper article from a newspaper's web site, or the text of a blog entry. In this case, the initial request made by the selection client 260*a* to the content server 106*a* (i.e., the second content request 262*b*) causes the content server 106*a* to provide the ultimate content of interest to the user 108*a*, in the form of the first requested content 272*a*.

In other embodiments, content may be presented to the users 108*a-b* in two or more levels. As one example, content may be divided into and presented in the following three levels:

1. Publication
2. Section
3. Article

A single publication may include one or more sections. A single section may include one or more articles. This particular number and labeling of content levels is merely one example and does not constitute a limitation of the present invention. More generally, content may be organized into any number (i.e., one or more) of levels in embodiments of the present invention.

A "publication" may, for example, correspond to any content source, such as an entire web site or other content accessible via a particular domain or sub-domain, such as www.nytimes.com or fashion.nytimes.com. Sections within a publication may, for example, correspond to any subsets of the content available at the content source corresponding to the publication. For example, if the publication is a web site (e.g., the web site accessible at www.nytimes.com), then each section of the publication may correspond to a distinct web page within the web site, content accessible at a distinct sub-domain of the web site, or content accessible at a distinct directory of the web site. Articles within a section may, for example, correspond to any subsets of the content associated with the section, such as distinct web pages within a sub-domain or directory of the web site.

As described above, the selection server 256 may maintain selection data for each of the selections associated with a user. For example, the selection server 256 may maintain selection data 252*a-c* associated with user 108*a*. In the examples described above, selection data 252*a* represents a first selection associated with user 108*a*, and such selection data 252*a* may be represented by a data structure 400 having the form shown in FIG. 4A. More generally, as illustrated in FIG. 4B, selection data 252*a* may include multiple data structures having the form of data structure 400, one for each level of the corresponding selection.

Figure 4B:
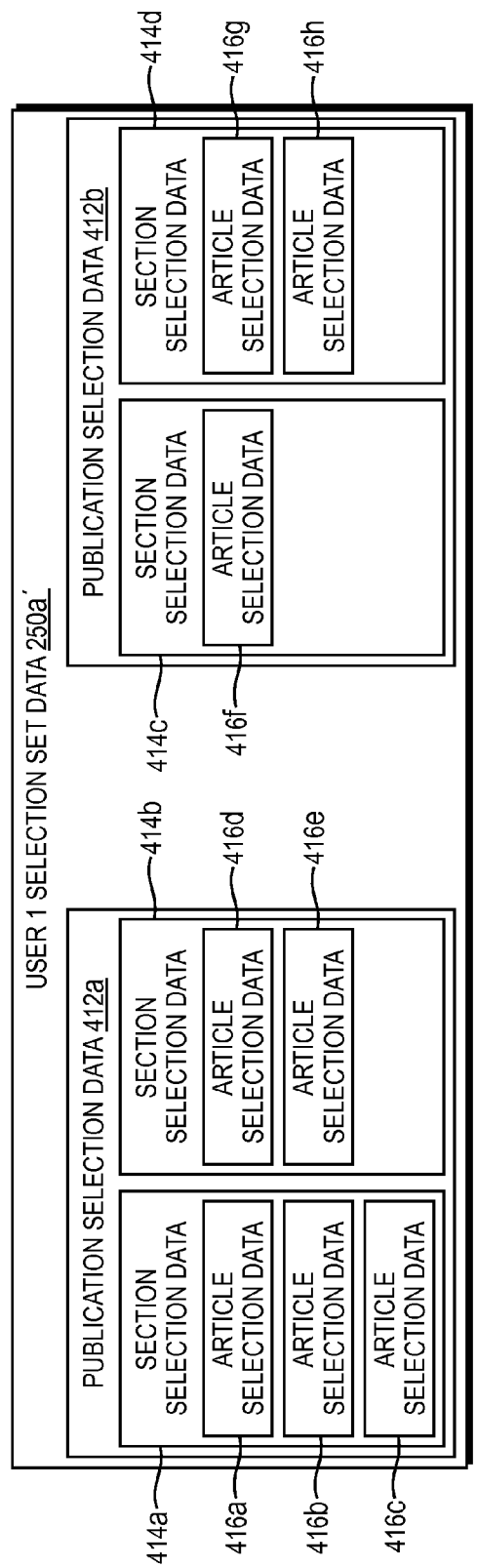
FIG. 4B is a diagram of a data structure for implementing multi-level selection data according to one embodiment of the present invention.

In particular, in the example of FIG. 4B, the content selection set data 250*a'* associated with user 108*a* includes publication selection data 412*a* and publication selection data 412*b*, each of which may be instances of the data structure 400 of FIG. 4A. Publication selection data 412*a* is associated with a first publication (e.g., content source) and publication selection data 412*b* is associated with a second publication (e.g., content source) that differs from the first publication. Therefore, publication selection data 412*a* may operate in the same or similar manner to selection data 252*a* as described above, and publication selection data 412*b* may operate in the same or similar manner to selection data 252*b* as described above. In other words, the content selection set data 250*a* illustrated in FIG. 2 may be viewed as a special case of the content selection set data 250*a*' of FIG. 4B, namely a special case in which the selection data 252*a-c* each represents only a single level of content.

Returning to FIG. 4B, the publication selection data 412*a* includes, by way of example, section selection data 414*a* and 414*b*, each of which may be instances of the data structure 400 of FIG. 4A. Section selection data 414*a* represents a first section of the publication (e.g., content sources) associated with publication selection data 412*a*, and section selection data 414*b* represents a second section of the publication associated with the publication selection data 412*a*.

Furthermore, section selection data 412*a* includes, by way of example, article selection data 416*a*, 416*b*, and 416*c*, each of which may be instances of the data structure of FIG. 4A. Article selection data 416*a* represents a first article within the section represented by section selection data 414*a*; article selection data 416*b* represents a second article within the section represented by section selection data 414*a*; and article selection data 416*c* represents a third article within the section represented by section selection data 414*a*.

The content and purpose of the remaining data in FIG. 4B, namely the article selection data 416*d-e*, the section selection data 414*c-d*, and the article selection data 416*f-h*, should be clear from the description above.

Although the various data structures 412*a-b*, 414*a-d*, and 416*a-h* in FIG. 4B may share the format of the data structure 400 of FIG. 4A, the values within those data structures 412*a-b*, 414*a-d*, and 416*a-h* may vary in any way. In particular, each of the data structures 412*a-b*, 414*a-d*, and 416*a-h* may contain any parsing rule(s) in field 402*d* and any dialogue rule(s) in field 402*e*. For example:

- the rules (e.g., parsing rules and/or dialogue rules) within publication selection data 412*a* may differ from the rules within publication selection data 412*b* (thereby demonstrating that rules may differ from one unit of publication selection data to another);
- the rules within section selection data 414*a* may differ from the rules within section selection data 414*b* (thereby demonstrating that rules may differ from one unit of section selection data to another unit of section selection data within the same unit of publication selection data);
- the rules within article selection data 416*a* may differ from the rules within article selection data 416*b* (thereby demonstrating that rules may differ from one unit of article selection data to another unit of article selection data within the same unit of section selection data);
- the rules within section selection data 414*a* may differ from the rules within section selection data 414*c* (thereby demonstrating that rules may differ from one unit of section selection data within one unit of publication selection data to another unit of section selection data within a different unit of publication selection data);
- the rules within article selection data 416*a* may differ from the rules within article selection data 416*d* (thereby demonstrating that rules may differ from one unit of article selection data within one unit of section selection data to another unit of article selection data within a different unit of section selection data); and
- the rules within article selection data 416*a* may differ from the rules within article selection data 416*f* (thereby demonstrating that rules may differ from one unit of article selection data within one unit of publication selection data to another unit of article selection data within a different unit of publication selection data).

As described above, parsing rules and dialogue rules may be specific to a particular selection. Therefore, parsing rules and dialogue rules may, for example, be specific to a particular publication, section, or article. As a result, parsing rules may vary among and within publications, among and within sections, and among and within articles. More generally, rules (e.g., parsing rules and/or dialogue rules) may vary among and/or within any level of content.

The description above states that the selection server 256 may transmit the selection data corresponding to the selection indicated by user 108*a*'s first input 270*a*. The selection server 256 need not, however, transmit an entire unit of selection data to the selection client 260*a* in response to the first input 270*a*. For example, assume that the user's first input 270*a* indicates selection data 252*a*, and that selection data 252*a* includes data representing the corresponding publication, sections within that publication, and articles within those sections. In response to the user's first input 270*a*, the selection server 256 may transmit only those portions of the selection data 252*a* that correspond to the publication level and the section level, but not those portions of the selection data that correspond to the article level (such as article headlines, article URLs, article-specific parsing rules, or article-specific dialogue rules). Instead, the user 108*a* may subsequently provide additional input indicating a specific section. In response to such input, the selection server 256 may transmit to the selection client 260*a* article data for articles within the indicated section. Such a process may be repeated for any number of content levels.

Figure 8:
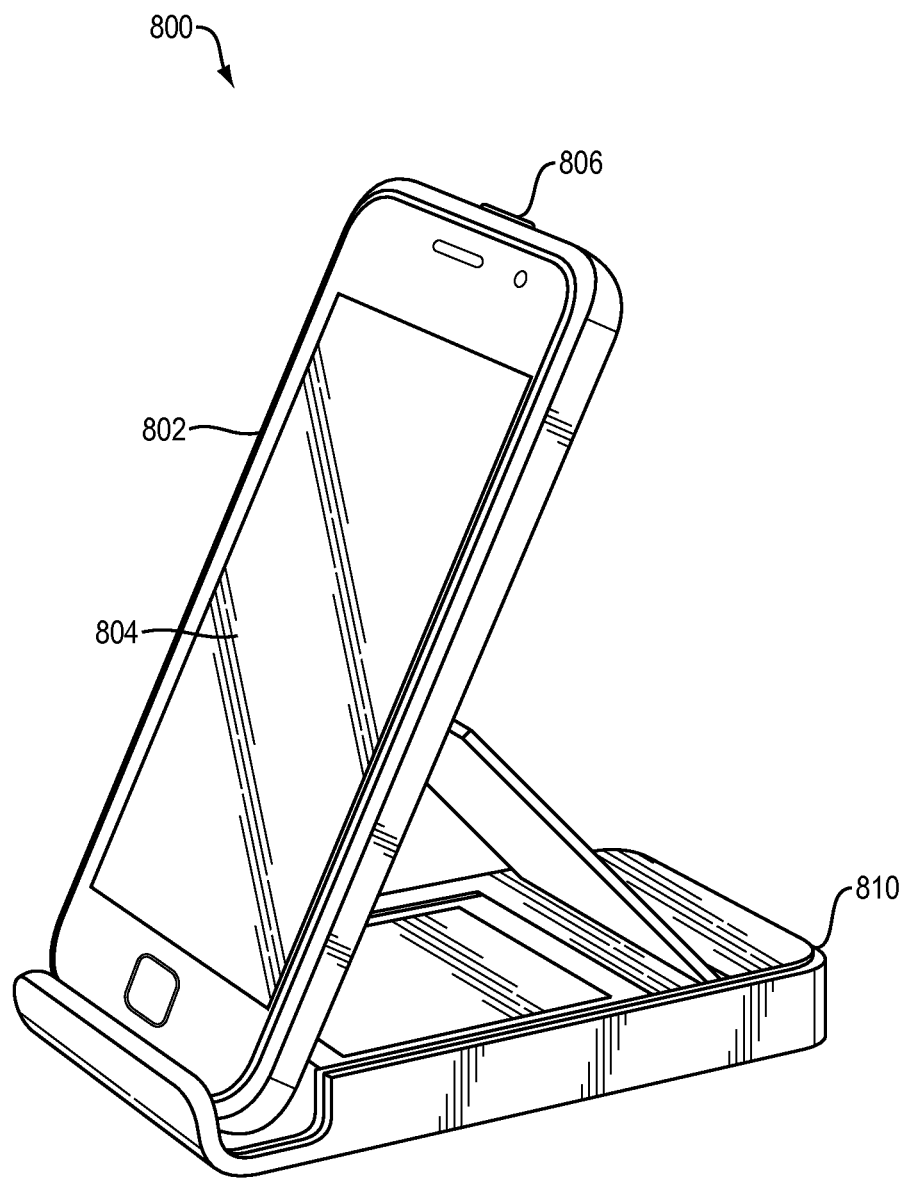
FIG. 8 is an illustration of an embodiment of the user device of FIG. 1 according to one embodiment of the present invention.

Embodiments of the present invention may be implemented in any of a variety of devices. For example, as illustrated in FIG. 8, in one embodiment of the present invention, the techniques disclosed herein are implemented in a system 800 including a tablet computer 802. The tablet computer 802 includes a touch screen 804 and microphone 806 for user input. The computer 802 is configured with an operating system and a software application designed to launch automatically upon booting up the computer 802. The application may, for example, provide a user interface that displays a single button covering the entire screen with a label such as "Push to Talk." As a result, the user may touch any location on the screen 804, in response to which the computer 802 may initiate the method of FIGS. 3A-3B and begin by speaking the list of the user's selections to the user. The computer 802 may be connected to a docking station 810 or other source of AC power so that the user of the computer 802, who may be blind or otherwise visually disabled, may avoid the need to connect the computer 802 to a source of power if the computer's battery runs out of power.

Embodiments of the present invention have a variety of advantages, such as the following. As described above, various human-machine dialogue systems, such as voice-based web browsers, exist. Such systems, however, have a variety of limitations. For example, content on the World Wide Web varies greatly both in its form and substance. The Web includes information on nearly every topic of interest to people, written in a wide and increasing variety of forms and formats. For example, web pages may include newspaper articles consisting primarily of text divided into sections, photo galleries formatted as a single variable image with navigation (e.g., "previous" and "next") controls, movie listings, and financial data. Existing voice-based web browsers, which use a "one size fits all" approach to speaking such content, prompting users for voice commands, and processing such commands, often face significant problems because such difference in content need to be reflected in how such content is integrated into a human-machine dialogue. Even differences as seemingly minor in variations in how different news web sites format their web pages can make it difficult for traditional voice-based web browsers to process such content in a way that provides a satisfying and useful experience to the end user.

Embodiments of the present invention overcome this problem by using, within a human-machine dialogue system, parsing rules and dialogue rules that are specific to individual sources of content (e.g., web sites). The parsing rules and dialogue rules that are associated with a particular content source reflect the way in which content is formatted and organized by that content source. For example, the source-specific parsing rules associated with a particular content source may reflect the type and location of advertisements within that content source so that such advertisements may be removed before the content is rendered to the user, without inadvertently also removing desired content, such as the body of an article that is adjacent to an advertisement. As another example, the source-specific dialogue rules associated with a particular content source may reflect the permissible commands for navigating within content from that source. For example, when browsing financial data it may be permissible for the user to speak a date range to hear financial data falling within that range, and when browsing movie listings it may be permissible for the user to speak a zip code to hear listings of movies playing within that zip code. Source-specific dialogue rules used by embodiments of the present invention may reflect such differences in permissible commands.

The use of source-specific parsing rules and dialogue rules, in other words, enables embodiments of the present invention both to render content to the user as accurately, efficiently, and usefully as possible, and to enable the user to issue voice commands that are as useful as possible and that are most likely to be interpreted accurately by the human-machine dialogue system.

Another advantage of embodiments of the present invention is that they may be implemented independently of existing content sources. For example, the selection server 256 and selection client 260*a* may be implemented independently of the content servers 106*a-b*. One consequence of this is that embodiments of the present invention may be implemented for use in connection with such content servers 106*a-b* without requiring any modification to such content servers 106*a-b*, and without the permission or cooperation of the owners or managers of the content servers 106*a-b*. As a result, embodiments of the present invention may be implemented for use with a wide variety of existing content without requiring any effort by the designers of such embodiments or the end users of such embodiments to obtain the permission or cooperation of the owners or managers of the content servers 106*a-b*. Users may therefore immediately begin using embodiments of the present invention to access any content sources to which they already have access.

This includes the ability for users to access content that requires authentication. As a result, the fact that a particular content source requires a user to be authenticated before the user can access the content source does not prevent the user from using embodiments of the present invention to access content from the content source. As described above, the selection server may store, for each user of the system, the user's authentication credentials (if any) for each content source associated with the user's selections. The selection client 260*a* may then use such credentials to automatically and seamlessly authenticate the user to each of the content sources associated with the user's selections before retrieving content from such content sources. As a result, if a user has credentials to access content from a particular content source, then the user may use embodiments of the present invention to access content from that content source without any additional effort other than the effort required to provide the user's credentials to the selection server 256 one time.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

Any reference herein to clients and/or servers in a client-server architecture is merely an example and does not constitute a limitation of the present invention. Embodiments of the present invention are not limited to use with client-server architectures. Therefore, any use of the terms "client" and "server" should be understood more generally to refer to any module (including hardware and/or software) for performing the functions disclosed herein, whether or not such modules operate according to a client-server architecture.

Although certain embodiments disclosed herein may be characterized as using pull-based techniques to provide content to the user devices 210*a-b* (i.e., techniques in which the user devices 210*a-b* make requests to the content server 106*a* and in which the content server 106*a* provides content to the user devices 210*a-b* in response to the requests), this is merely an example and not a limitation of the present invention. Embodiments of the present invention may, for example, use push-based techniques to provide content to the user devices 210*a-b*. For example, the content server 106*a* may provide content to the user devices 210*a-b* even if the user devices 210*a-b* have not requested such content from the content server 106*a*.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method performed by at least one computer processor executing computer program instructions stored on a non-transitory computer-readable medium, wherein the method comprises:
   (A) identifying, from among a plurality of content selection data associated with a user, first content selection data associated with the user;
   (B) identifying a first content source associated with the first content selection data;
   (C) identifying a first selection-specific rule set associated with the first content selection data;
   (D) receiving first original content from the first content source;
   (E) applying the first selection-specific rule set to the first original content to produce first rule output; and
   (F) changing a state of at least one first component of a human-machine dialogue system based on the first rule output.

2. The method of claim 1, wherein the at least one first component comprises a text-to-act engine.

3. The method of claim 1, wherein the at least one first component comprises a dialogue manager.

4. The method of claim 1, wherein the at least one first component comprises an act-to-text engine.

5. The method of claim 1, further comprising:
   (E) identifying, from among the plurality of content selection data associated with the user, second content selection data associated with the user, wherein the second content selection data differs from the first content selection data;
   (F) identifying a second content source associated with the second content selection data;
   (G) identifying a second selection-specific rule set associated with the second content source, wherein the second selection-specific rule set differs from the first selection-specific rule set;
   (H) receiving second original content from the second content source;
   (I) applying the second selection-specific rule set to the second original content to produce second rule output; and
   (J) changing a state of at least one second component of the human-machine dialogue system based on the second rule output.

6. The method of claim 5, wherein the at least one first component is the same as the at least one second component.

7. The method of claim 5, wherein the at least one first component differs from the at least one second component.

8. The method of claim 1, wherein the first selection-specific rule set comprises a first parsing rule.

9. The method of claim 1, wherein the first selection-specific rule set comprises a first dialogue rule.

10. The method of claim 1, wherein (A) comprises:
    (A)(1) outputting a first audio stream representing content selection set data, wherein the content selection set data represents the plurality of content selection data associated with the user; and
    (A)(2) receiving, from the user, first user input indicating the first content selection data associated with the user.

11. The method of claim 10, wherein (A) further comprises:
    (A)(3) before (A)(1), providing, to a selection server that is functionally independent of the content source, a first request for the content selection set data; and
    (A)(2) before (A)(1), receiving, from the selection server, the content selection set data.

12. The method of claim 11:
    wherein the content selection set data includes the first content selection data; and
    wherein the first content selection data includes the first selection-specific rule.

13. The method of claim 12:
    wherein the content selection set data further includes second content selection data associated with the user, wherein the second content selection data is associated with a second content source that differs from the first content source; and
    wherein the second content selection data includes a second selection-specific rule that differs from the first selection-specific rule.

14. The method of claim 10, wherein (B) comprises:
    (B)(1) identifying the first content source associated with the first content selection data based on the first user input indicating the first content selection data.

15. The method of claim 10, wherein the first user input comprises voice input representing first speech of the user.

16. The method of claim 15:
    wherein the human-machine dialogue system comprises a plurality of components including a speech-to-text engine, a text-to-act engine, a dialogue manager, an act-to-text engine, and a text-to-speech engine;

wherein the plurality of components includes the at least one first component; and wherein the method further comprises:

(G) applying the speech-to-text engine to the voice input to produce first text;

(H) applying the text-to-act engine to the first text to produce first act data;

(I) applying the dialogue manager to the first act data to produce first response act data;

(J) applying the act-to-text engine to the first response act data to produce second text;

(K) applying the text-to-speech engine to the second text to produce speech data representing second speech; and (L) producing audio output representing the speech data.

17. The method of claim 16, wherein the at least one first component comprises the text-to-act engine.

18. The method of claim 16, wherein the at least one component comprises the dialogue manager.

19. The method of claim 16, wherein the at least one component comprises the act-to-text engine.

20. The method of claim 16:

wherein (A)(2) comprises receiving the first user input from the user via an input component of a user device; and wherein the user device includes the human-machine dialogue system.

21. The method of claim 1:

wherein the first selection-specific rule set comprises a first parsing rule associated with the first content selection; and wherein (E) comprises:

(E)(1) applying the first parsing rule to the first original content to produce first derived content;

(E)(2) identifying a first dialogue rule associated with the first content selection; and (E)(3) applying the first dialogue rule to the first derived content to produce the first rule output.

22. The method of claim 1, wherein (D) comprises:

(D)(1) identifying first authentication data associated with the user and the first content source;

(D)(2) authenticating the user at the first content source using the first authentication data; and (D)(3) receiving the first original content from the first content source after authenticating the user at the first content source.

23. The method of claim 22, further comprising:

(G) identifying, from among the plurality of content selection data associated with the user, second content selection data associated with the user, wherein the second content selection data differs from the first content selection data;

(H) identifying a second content source associated with the second content selection data;

(I) identifying a second selection-specific rule set associated with the second content selection data; and (J) receiving second original content from the second content source, comprising:

(J)(1) identifying second authentication data associated with the user and the second content source, wherein the second authentication data differs from the first authentication data;

(J)(2) authenticating the user at the second content source using the second authentication data; and (J)(3) receiving the second original content from the second content source after authenticating the user at the second content source.

24. The method of claim 1, wherein the first selection-specific rule set consists of a single selection-specific rule.

25. The method of claim 24, wherein the first selection-specific rule set comprises a plurality of selection-specific rules.

26. A computer-readable medium comprising computer program instructions stored on a non-transitory computer-readable medium, wherein the instructions are executable by at least one computer processor to perform a method comprising:

(A) identifying, from among a plurality of content selection data associated with a user, first content selection data associated with the user;

(B) identifying a first content source associated with the first content selection data;

(C) identifying a first selection-specific rule set associated with the first content selection data;

(D) receiving first original content from the first content source;

(E) applying the first selection-specific rule set to the first original content to produce first rule output; and (F) changing a state of at least one first component of a human-machine dialogue system based on the first rule output.

27. The computer-readable medium of claim 26, wherein the at least one first component comprises a text-to-act engine.

28. The computer-readable medium of claim 26, wherein the at least one first component comprises a dialogue manager.

29. The computer-readable medium of claim 26, wherein the at least one first component comprises an act-to-text engine.

30. The computer-readable medium of claim 26, wherein the method further comprises:

(E) identifying, from among the plurality of content selection data associated with the user, second content selection data associated with the user, wherein the second content selection data differs from the first content selection data;

(F) identifying a second content source associated with the second content selection data;

(G) identifying a second selection-specific rule set associated with the second content source, wherein the second selection-specific rule set differs from the first selection-specific rule set;

(H) receiving second original content from the second content source;

(I) applying the second selection-specific rule set to the second original content to produce second rule output; and (J) changing a state of at least one second component of the human-machine dialogue system based on the second rule output.

31. The computer-readable medium of claim 30, wherein the at least one first component is the same as the at least one second component.

32. The computer-readable medium of claim 30, wherein the at least one first component differs from the at least one second component.

33. The computer-readable medium of claim 26, wherein the first selection-specific rule set comprises a first parsing rule.

34. The computer-readable medium of claim 26, wherein the first selection-specific rule set comprises a first dialogue rule.

35. The computer-readable medium of claim 26, wherein (A) comprises:
- (A)(1) outputting a first audio stream representing content selection set data, wherein the content selection set data represents the plurality of content selection data associated with the user; and
- (A)(2) receiving, from the user, first user input indicating the first content selection data associated with the user.

36. The computer-readable medium of claim 35, wherein (A) further comprises:
- (A)(3) before (A)(1), providing, to a selection server that is functionally independent of the content source, a first request for the content selection set data; and
- (A)(2) before (A)(1), receiving, from the selection server, the content selection set data.

37. The computer-readable medium of claim 36:
- wherein the content selection set data includes the first content selection data; and
- wherein the first content selection data includes the first selection-specific rule.

38. The computer-readable medium of claim 37:
- wherein the content selection set data further includes second content selection data associated with the user, wherein the second content selection data is associated with a second content source that differs from the first content source; and
- wherein the second content selection data includes a second selection-specific rule that differs from the first selection-specific rule.

39. The computer-readable medium of claim 35, wherein (B) comprises:
- (B)(1) identifying the first content source associated with the first content selection data based on the first user input indicating the first content selection data.

40. The computer-readable medium of claim 35, wherein the first user input comprises voice input representing first speech of the user.

41. The computer-readable medium of claim 40:
- wherein the human-machine dialogue system comprises a plurality of components including a speech-to-text engine, a text-to-act engine, a dialogue manager, an act-to-text engine, and a text-to-speech engine;
- wherein the plurality of components includes the at least one first component; and
- wherein the method further comprises:
  - (G) applying the speech-to-text engine to the voice input to produce first text;
  - (H) applying the text-to-act engine to the first text to produce first act data;
  - (I) applying the dialogue manager to the first act data to produce first response act data;
  - (J) applying the act-to-text engine to the first response act data to produce second text;
  - (K) applying the text-to-speech engine to the second text to produce speech data representing second speech; and
  - (L) producing audio output representing the speech data.

42. The computer-readable medium of claim 41, wherein the at least one first component comprises the text-to-act engine.

43. The computer-readable medium of claim 41, wherein the at least one component comprises the dialogue manager.

44. The computer-readable medium of claim 41, wherein the at least one component comprises the act-to-text engine.

45. The computer-readable medium of claim 41:
- wherein (A)(2) comprises receiving the first user input from the user via an input component of a user device; and
- wherein the user device includes the human-machine dialogue system.

46. The computer-readable medium of claim 26:
- wherein the first selection-specific rule set comprises a first parsing rule associated with the first content selection; and
- wherein (E) comprises:
  - (E)(1) applying the first parsing rule to the first original content to produce first derived content;
  - (E)(2) identifying a first dialogue rule associated with the first content selection; and
  - (E)(3) applying the first dialogue rule to the first derived content to produce the first rule output.

47. The computer-readable medium of claim 26, wherein (D) comprises:
- (D)(1) identifying first authentication data associated with the user and the first content source;
- (D)(2) authenticating the user at the first content source using the first authentication data; and
- (D)(3) receiving the first original content from the first content source after authenticating the user at the first content source.

48. The computer-readable medium of claim 47, wherein the method further comprises:
- (G) identifying, from among the plurality of content selection data associated with the user, second content selection data associated with the user, wherein the second content selection data differs from the first content selection data;
- (H) identifying a second content source associated with the second content selection data;
- (I) identifying a second selection-specific rule set associated with the second content selection data; and
- (J) receiving second original content from the second content source, comprising:
  - (J)(1) identifying second authentication data associated with the user and the second content source, wherein the second authentication data differs from the first authentication data;
  - (J)(2) authenticating the user at the second content source using the second authentication data; and
  - (J)(3) receiving the second original content from the second content source after authenticating the user at the second content source.

49. The computer-readable medium of claim 26, wherein the first selection-specific rule set consists of a single selection-specific rule.

50. The computer-readable medium of claim 49, wherein the first selection-specific rule set comprises a plurality of selection-specific rules.

* * * * *